Oct. 9, 1928.
P. A. WHITE
1,686,778
SECURING MEANS FOR DEMOUNTABLE RIMS
Filed April 22, 1921   3 Sheets-Sheet 1
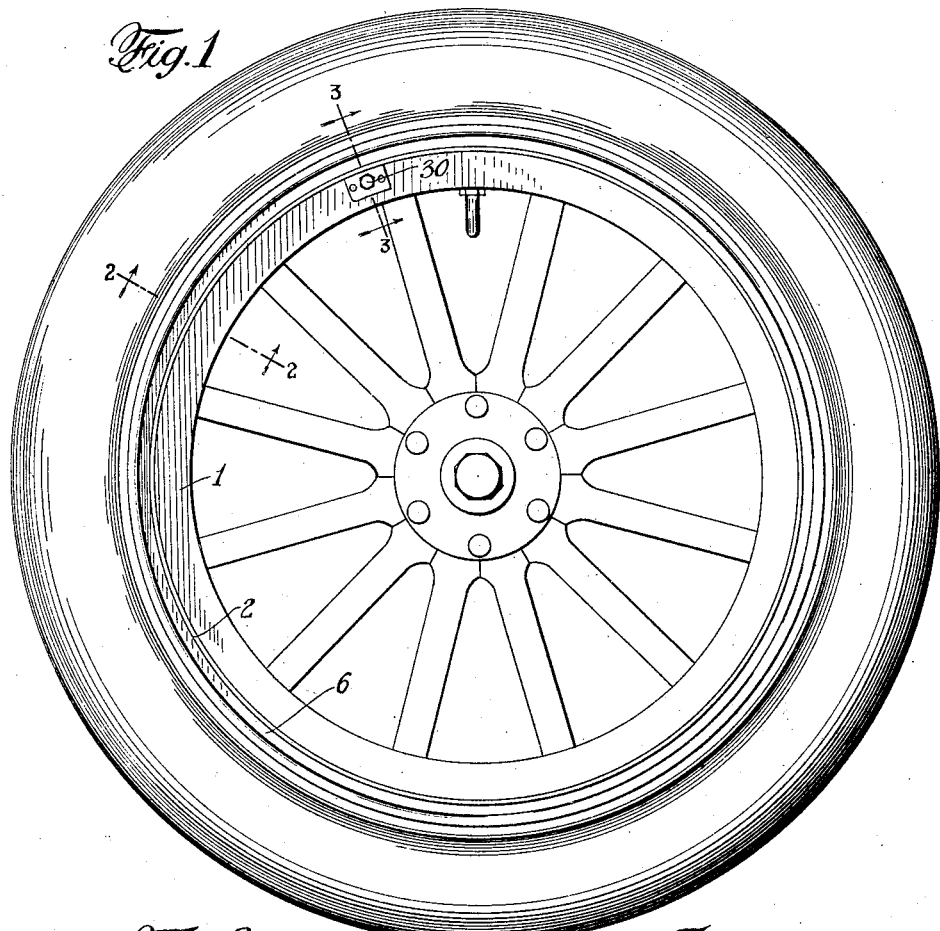
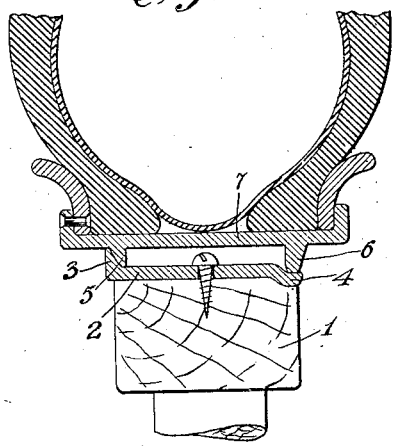
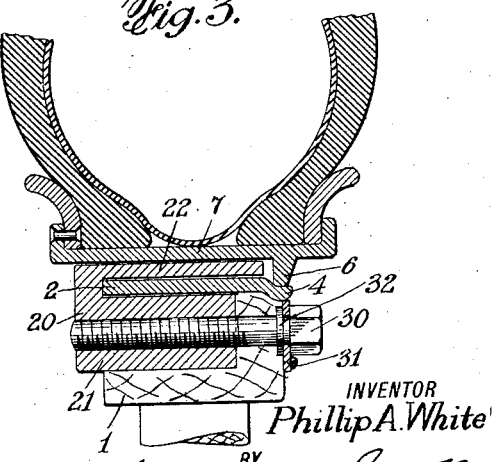
INVENTOR
Phillip A. White
BY
Prindle, Wright and Small
ATTORNEYS Oct. 9, 1928.　　　　　　　　　　　　　　　1,686,778
P. A. WHITE
SECURING MEANS FOR DEMOUNTABLE RIMS
Filed April 22, 1921　　　3 Sheets-Sheet 2
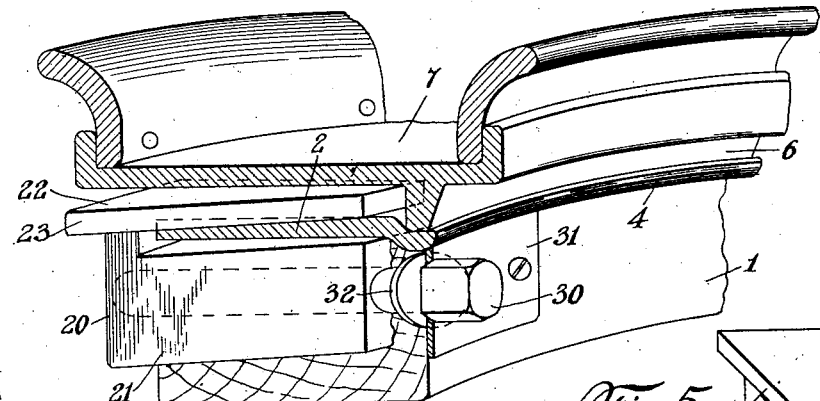
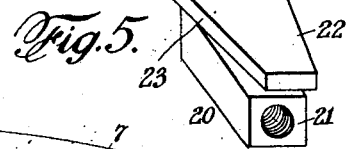
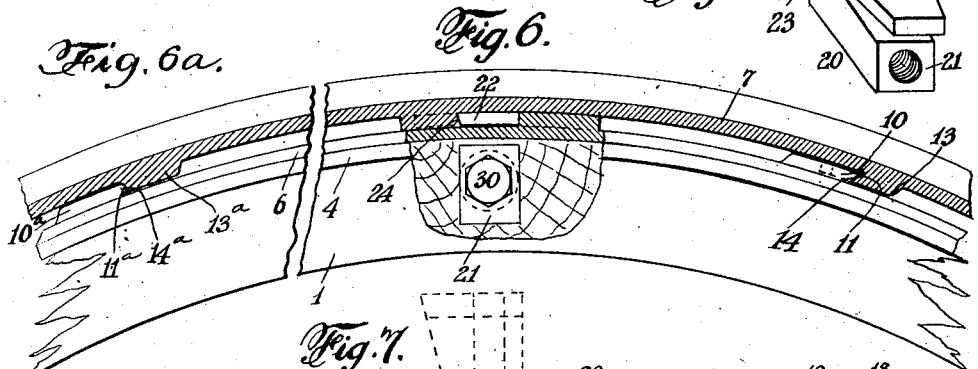
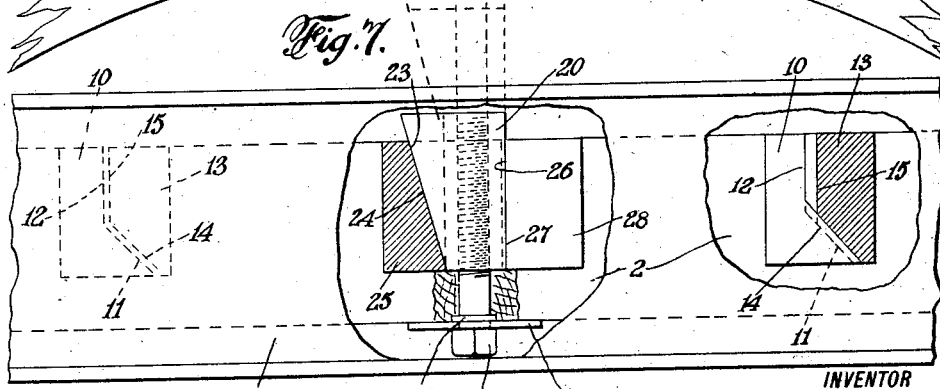
INVENTOR
Phillip A. White
BY
Prindle, Wright and Small
ATTORNEYS Oct. 9, 1928.  
P. A. WHITE  
1,686,778  
SECURING MEANS FOR DEMOUNTABLE RIMS  
Filed April 22, 1921  
3 Sheets-Sheet 3
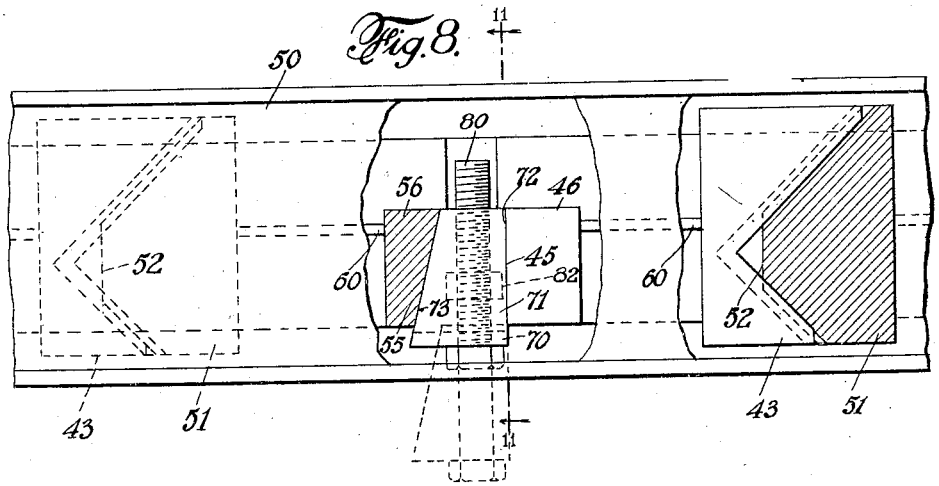
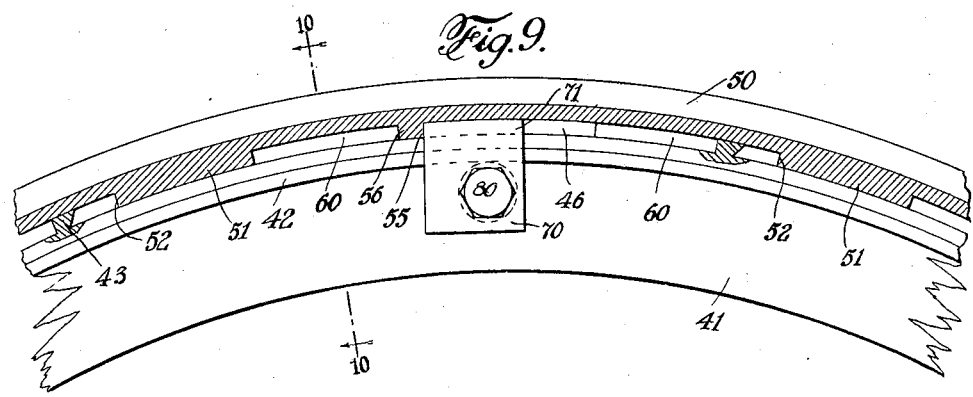
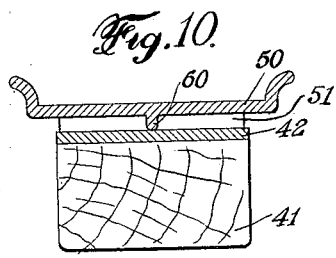
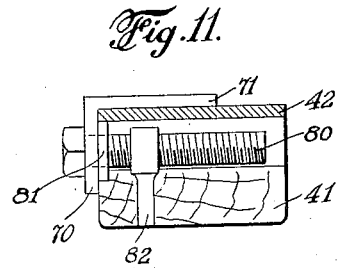
INVENTOR  
*Phillip A. White*  
BY  
*Prindle, Wright and Small*  
ATTORNEYS Patented Oct. 9, 1928.

1,686,778

UNITED STATES PATENT OFFICE.

PHILLIP A. WHITE, OF LONG ISLAND CITY, NEW YORK.

SECURING MEANS FOR DEMOUNTABLE RIMS.

Application filed April 22, 1921. Serial No. 463,548.

My invention relates to securing means for demountable rims and has for its object to provide means adapted to secure a demountable rim to its wheel positively and with a minimum number of locknuts.

A further object of my invention is to provide a securing device which tends to draw the rim toward the wheel as it is locked in place.

A further object of my invention is to provide a securing device which tends to center and align the rim on its felloe as it is locked into place.

Other and further objects of my invention will be apparent from the following description and from the accompanying drawing of embodiments thereof, in which Figure 1 is a side elevation of a wheel, rim, and tire with one embodiment of the invention thereon;

Figure 2 is a section taken on the line 2—2 of Figure 1 looking in the direction of the arrows;

Figure 3 a section taken on the line 3—3 of Figure 1 looking in the direction of the arrows;

Figure 4 an enlarged section through a rim and felloe shown partly in perspective;

Figure 5 a perspective of the locknut shown in Figure 4;

Figure 6 a side elevation of a portion of a felloe with parts broken away and with the rim in section;

Fig. 6ª is a view similar to Fig. 6, but showing a somewhat modified construction;

Figure 7 a plan of a rim and felloe with parts broken away;

Figure 8 a plan of a rim and felloe with parts broken away and showing another embodiment of the invention;

Figure 9 a side elevation of a portion of a felloe with parts broken away and with the rim in section and showing the embodiment of Figure 8;

Figure 10 a transverse section on the line 10—10 of Figure 9, looking in the direction of the arrows; and Figure 11 a transverse section on the line 11—11 of Figure 8 looking in the direction of the arrows.

Similar reference characters refer to similar parts throughout the drawings.

In the embodiment of Figures 1 to 7, reference character 1 indicates the felloe of a wheel having thereon a felloe band 2 (Figures 2 and 3) provided with a flange 3 and with a depression 4. A rim 7, on which the tire is mounted, is provided with circumferential beads or extensions 5 and 6 adapted, respectively, to engage said flange 3 and depression 4 on the felloe band when the rim is placed thereon. To hold the rim in this position, the felloe band is provided with any desired number of stops 10 (Figures 6 and 7) adapted to be engaged by corresponding projections 13 on the rim. Each stop 10 may have a slanting edge 11 and a straight edge 12, and each projection 13 a corresponding slanting edge 14 and a straight edge 15. Other suitable forms of stop and projection may be used if desired. When the embodiment having straight portions is used, the parts preferably are so proportioned that the slanting edge 11 of stop 10 will be engaged by the corresponding slanting edge 14 of projection 13 before the respective straight edges 12 and 15 meet, thus compensating for wear. The slanting edge 11 on stop 10 may be undercut and the slanting edge 14 on projection 13 may be correspondingly beveled as shown Figure 6, or slanting edge 11ª on stop 10ª may be convex and slanting edge 14ª on projection 13ª correspondingly concave as shown at the left of Figure 6. The undercut, beveled, convex or concave edges form interlocking elements on the stops and projections.

The rim is placed on the felloe band in the usual manner and until extensions 5 and 6 on the rim respectively engage flange 3 and depression 4 on the felloe band, and then is rotated until projection 13 on the rim engages stop 10 on the felloe band. The engagement of slanting portion 11 on each projection 13 with slanting portion 14 on each stop 10 will tend to force extensions 5 and 6 on the rim tightly against the respective flange 3 and depression 4 and hold them in engagement. The undercut and bevel construction tend to draw the rim toward the felloe and prevent squeaking and rattling and the disengagement of the rim from the felloe if tire becomes deflated.

The rim is held in this position on the felloe by a locknut 20, which preferably is wedgeshape so that if desired the operation of the locknut will force the rim into place merely by its operation. The locknut of this embodiment preferably comprises an inner part 21 adapted to slide under felloe band 2 in a recess made therefor in felloe 1, and an outer part 22 made wedgeshape in any desired manner as by a slanting edge 23 and a straight edge 26. The locknut is operated by a lockbolt 30 held in position on the felloe by a plate 31 engaged by a collar 32 on the bolt.

In operation, the outer part 22 of locknut 20 engages its straight edge 26 against the straight edge 27 on a block 28 on felloe band 2, so that when lockbolt 30 is operated, slanting edge 23 on said outer part 22 will engage a similar slanting edge 24 on a projection 25 on the rim and force the rim to final locked position. The rim cannot be moved until the locknut is removed by operation of lockbolt 30 from its locking position as indicated in full lines in Figure 7 to the position indicated in dotted lines in the same figure.

In the embodiment of Figures 8 to 11, reference character 41 indicates the felloe of a wheel having thereon a felloe band 42 provided with any desired number of undercut V-shaped stops 43. A rim 50 on which the tire is mounted is provided with any desired number of wedgeshaped, beveled projections 51 adapted to engage the undercut V-shaped stops 43 on felloe band 42. One side of the V on stop 43 and of the wedge on projection 51 is longer than the other side so that the rim may be placed on the wheel. If the rim then is rotated, projection 51 will engage stop 43, thus centering the rim on the felloe band and preventing any sidewise movement. The undercut and beveled construction tends to pull the rim toward the felloe band, thus obviating rattling and squeaking. In order to compensate for wear, projection 51 has its end cut-off at 52 to any desired extent. Circumferential spacing 60 may be provided on rim 50 between projections 51 in order to support the rim from the felloe band.

The rim is held in this position on the felloe by a locknut 70, which preferably is wedgeshape so that if desired the operation of the locknut will force the rim into place merely by its operation. The locknut of this embodiment preferably comprises a plate 71 having a straight edge 72 and a slanting edge 73 adapted to engage, respectively, a straight edge 45 of a stop 46 on felloe band 42 and a slanting edge 55 on a projection 56 on rim 50. The locknut is operated by a lockbolt 80 having a collar 81 and working in an anchored nut 82.

In operation, the straight edge 72 of locknut 70 engages straight edge 45 of stop 46, so that when lockbolt 80 is operated, slanting edge 73 on locknut 70 will engage slanting edge 55 on projection 56 and force the rim to final locked position. The rim cannot be moved until the locknut is removed by operation of lockbolt 70 from its locking position as indicated in full lines in Figure 8 to the position indicated in dotted lines in the same figure.

Many modifications of my invention will be apparent to those skilled in the art without departing therefrom or from the scope of the claims, my invention not being limited to the particular embodiment chosen for purposes of illustration, but consisting of means to lock a rim securely in position on a felloe by a single locking device, within the scope of the appended claims.

What I claim and desire to protect by Letters Patent is:

1. In combination a wheel having a felloe presenting a lock nut receiving recess, a felloe band mounted on said felloe, a tire carrying rim of a size to surround said felloe band, complementary interlocking means on the rim and band respectively for locking the rim to the band upon movement of the rim along the band, a lock nut having a portion to extend into the recess in the felloe and a wedging portion to engage and move the rim along the band, and a bolt to draw the lock nut into locking position.

2. In combination a wheel having a felloe presenting a squared lock nut receiving recess, a felloe band mounted on said felloe, a tire carrying rim of a size to surround said felloe band, complementary interlocking means on the rim and band respectively for locking the rim to the band upon movement of the rim along the band, a lock nut having a squared portion to extend into the recess in the felloe and a wedging portion to engage and move the rim along the band, and a bolt to draw the lock nut into locking position.

3. In combination a wheel having a felloe presenting a lock nut receiving recess, a felloe band mounted on said felloe, a tire carrying rim of a size to surround said felloe band, complementary interlocking means on the rim and band respectively for locking the rim to the band upon movement of the rim along the band, a lock nut having a portion to extend into the recess in the felloe and a wedging portion for movement between the rim and the band to engage and move the rim along the band, and a bolt threaded into the first mentioned portion of the lock nut to draw the lock nut into locking position.

In testimony that I claim the foregoing, I have hereunto set my hand this 13th day April, 1921.

PHILLIP A. WHITE.